Figure 1:
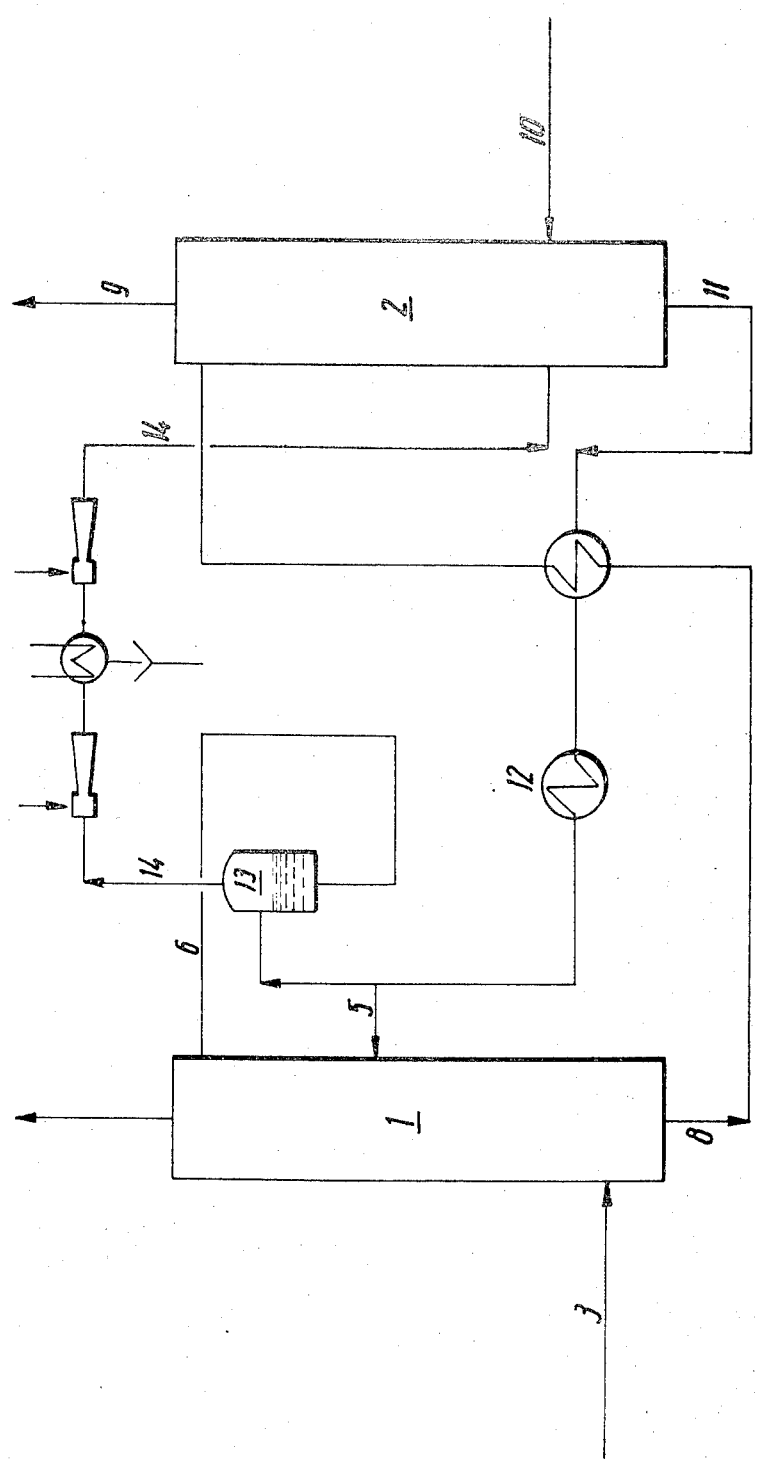

United States Patent [19]
Cocuzza et al.

[11] 3,856,484
[45] Dec. 24, 1974

[54] PROCESS FOR RECOVERING ETHYLENE OXIDE

[75] Inventors: Giacchino Cocuzza, Catania; Benedetto Calcagno, Milan, both of Italy

[73] Assignee: Societa' Italiana Resine S.I.R. S.p.A., Milan, Italy

[22] Filed: Nov. 15, 1973

[21] Appl. No.: 416,136

[30] Foreign Application Priority Data
Nov. 30, 1972 Italy.................................. 32275/72

[52] U.S. Cl.......................................... 55/48, 55/94
[51] Int. Cl............................................ B01d 53/14
[58] Field of Search............... 55/48, 51, 84, 89, 94; 260/348.5 R, 635 E

[56] References Cited
UNITED STATES PATENTS

| | | |
|---|---|---|
| 3,102,012 | 8/1963 | Dowd.................................... 55/48 |
| 3,165,539 | 1/1965 | Lutz...................................... 55/51 |
| 3,174,262 | 3/1965 | Lutz...................................... 55/51 |
| 3,766,714 | 10/1973 | Cunningham et al.................. 55/48 |

Primary Examiner—Charles N. Hart
Attorney, Agent, or Firm—Sughrue, Rothwell, Mion, Zinn & Macpeak

[57] ABSTRACT

Ethylene oxide is recovered from a gaseous mixture obtained by catalytic oxidation of ethylene. An aqueous solvent is used to absorb the gaseous mixture, the enriched solvent is stripped with steam in a stripping region and the lean solvent is supplied in two flows to two separate places of an absorption region, the secondary flow being substantially free from ethylene oxide and being kept at a temperature at least 15° C lower than that of the main flow.

7 Claims, 1 Drawing Figure

PROCESS FOR RECOVERING ETHYLENE OXIDE

BACKGROUND OF THE INVENTION

1. Field of the Invention

The invention relates to the recovery of ethylene oxide when mixed with normally gaseous products. More particularly, it relates to the recovery of ethylene oxide from catalytic oxidation products of gaseous mixtures containing ethylene.

2. Description of the Prior Art

It is known that, in industry, ethylene oxide is prepared by oxidizing ethylene with oxygen on silver-based catalysts at an elevated temperature. In these methods, the oxidation reactor is supplied with a gaseous mixture containing ethylene and oxygen diluted with an inert gas. The discharged reaction products contain up to approximately 3 percent by weight of ethylene oxide the remainder comprising besides inert gas, unreacted ethylene and oxygen, and by-products of the reaction.

In the prior-art methods, the gaseous mixtures are contacted with an aqueous solvent in an absorption column and the ethylene oxide is recovered by stripping enriched aqueous solvent with steam. The stripping of gases produced by the oxidation of ethylene requires large quantities of water, which are also needed for recovering the ethylene oxide without substantial conversion to glycol; consequently the lean aqueous solvent has to be recycled from the stripping region to the absorption region. As is known, however, the lean solvent contains about 0.05 percent by weight of residual ethylene oxide, in view of the conditions in which stripping is performed industrially. Consequently, owing to the low concentration of ethylene oxide in the gases produced in the catalytic oxidation of ethylene and owing to the presence of residual quantities in the lean solvent, the compound cannot be recovered in satisfactory amounts under the temperature and pressure conditions under which the reaction gases are stripped in practice.

In industry, efforts have been made to overcome the aforementioned disadvantages by hydrolyzing the ethylene oxide in the lean solvent. In other words, the aqueous solvent, after being discharged from the stripping phase, is maintained at a suitable temperature and pressure for sufficient time to convert the ethylene oxide into ethylene glycol. After being thus treated, the solvent is cooled and supplied to the phase for stripping the gases obtained by catalytic oxidation of ethylene.

The aforementioned method has various disadvantages, mainly in that the process for recovering ethylene oxide is complicated by introducing a hydrolysis step. Furthermore, owing to the accumulation of ethylene glycol in the aqueous solvent, the solvent has to be purified after a certain time, and it is difficult to recover the ethylene glycol from the diluted aqueous fraction after purification.

It has now been found possible to eliminate the aforementioned disadvantages in the recovery of ethylene oxide mixed with normally aqueous products.

SUMMARY

One object of the invention, therefore, is a process for completely recovering ethylene oxide from gaseous mixtures obtained in the catalytic oxidation of ethylene.

Another object of the invention is a process for recovering ethylene oxide from the aforementioned gaseous mixtures without appreciable conversion into ethylene glycol.

Other objects of the invention will be clear from the following description.

The process for recovering ethylene oxide according to the invention comprises a phase in which the gaseous mixture containing ethylene oxide is absorbed by an aqueous solvent, and a phase in which the enriched solvent is stripped and the lean solvent is recycled from the stripping phase to the absorption phase, and is based essentially on the fact that the lean solvent is supplied in the form of a main flow and a secondary flow to two separate places in the absorption region, the secondary flow being substantially free from ethylene oxide and being kept at a temperature at least 15° C lower than that of the main flow.

"Secondary flow substantially free from ethylene oxide" means that the flow contains not more than about 0.001 percent by weight of ethylene oxide.

More particularly, in the process according to the invention, the lean solvent discharged from the stripping phase and essentially comprising water and small quantities of ethylene oxide is first cooled to a temperature equal to, or less than, 40° C. The larger fraction of the cooled solvent is supplied as a main flow to a place between the head of an absorption column and the place where the gases containing ethylene oxide are supplied. The remaining fraction is conveyed to an environment in which partial evaporation is produced so as to maintain the environment at pressures equal to, or below 22 mmHg, and the residual liquid product is supplied as a secondary flow to the absorption column, at the end into which the exhausted gases are discharged.

The aims of the invention are achieved when the temperature of the secondary flow is maintained at, or below 25° C and the ratio by weight between the main and secondary flow supplied to the absorption phase is between about 2:1 and 5:1. Under the aforementioned conditions, the exhausted gases discharged from the absorption region contain less than about 0.006 percent by weight of ethylene oxide. Furthermore, in the process according to the invention, the products evolved in vapour form in the environment maintained at a lower than atmospheric pressure are supplied to the stripping column, thus ensuring complete recovery of the ethylene oxide.

In the accompanying drawing, reference 1 indicates the absorption column and reference 3 indicates a pipe supplying gases containing ethylene oxide. The gases, which are obained by catalytic oxidation of ethylene on silver-based catalysts, contain up to 3 percent, usually between about 1 and 3 percent, by weight of ethylene oxide, the remainder consisting of inert gases and smaller quantities of unreacted ethylene and oxygen. These gases are supplied to the bottom of the absorption column 1. The column operates at pressures normally between about 12 and 25 kg/cm² absolute. The secondary flow of aqueous absorption solvent is supplied via pipe 6 to the end of column 1 from which the exhausted gases are discharged, and the main flow is supplied via pipe 5 to a place in column 1 intermediate between the place where gases containing ethylene oxide are supplied and the place where the secondary flow of solvent is supplied.

In the process according to the invention, the weight ratio between the total supply of aqueous solvent and the supply of ethylene oxide in the gases obtained from oxidation of ethylene is maintained between about 20:1 and 100:1. Referring again to FIG. 1, the enriched aqueous solvent is discharged via pipe 8 and conveyed to the stripping column 2, where the major portion of the ethylene oxide is separated by steam supplied via pipe 10 at temperatures between about 104° and 127° C and at pressures between about 1.2 and 2.5 kg/cm² absolute. The products separated at the top of column 2 via pipe 9 are processed in the normal manner to separate the water and to dehydrate and purify the ethylene oxide. The lean solvent, essentially comprising water and between about 0.01 and 0.1 percent by weight of ethylene oxide, is discharged at the bottom of column 2 via pipe 11. The lean solvent is cooled at 12, e.g. in a water heat-exchanger, to temperatures equal to, or less than, 40° C, usually between about 30° and 40° C.

The larger fraction of cooled solvent is supplied as a main flow to absorption column 1 via pipe 5. The remaining fraction is supplied to a thermally-insulated negative-pressure chamber 13 and kept at a pressure equal to, or less than, 22 mmHg, usually between about 10 and 22 mmHg. The lean solvent is partially evaporated at 13, the amount evaporated being greater than 0.8 percent by weight of the quantity supplied. The residual liquid is discharged from 13 at a temperature equal to or below 25° C, usually between about 12° and 25° C, and is supplied as a secondary flow to the absorption column 1 via pipe 6. If the operation is performed under the aforementioned conditions, the secondary flow of lean solvent is practically free from ethylene oxide. The products evaporated in 13 are supplied via pipe 14 to the bottom of the stripping column 2.

In the preferred embodiment, the pressure in 13 is kept below the ambient pressure be means of ejectors, life steam being introduced from the last ejector to the bottom of the stripping column 2. FIG. 1 shows a system comprising two ejectors.

The method according to the invention ensures the practically complete recovery of ethylene oxide mixed with normally gaseous products without substantial conversion to glycol, and also ensures that the ethylene oxide is recovered under conditions of complete safety.

As is known, ethylene oxide has toxic effects and may form explosive mixtures. The process according to the invention completely eliminates the last-mentioned disadvantages by recycling the lean solvent. Finally, the aforementioned process is both simple and economically advantageous, more particularly compared with those processes using cooling devices, e.g. containing ammonia or fluorinated hydrocarbons (freon) for cooling the lean recycled solvent.

The invention is further illustrated by the following nonlimiting examples.

EXAMPLE

With reference to the drawing, an aqueous flow containing 0.015 percent by weight of ethylene oxide is withdrawn from the stripping column 2, the base of which is maintained at a pressure of 1.3 kg/cm² absolute and a temperature of 107° C. The aqueous flow, after initial cooling in a heat-recovery appatatus, is introduced into a water cooler 12, where it is cooled to 40° C. After being cooled a part (80 percent) of the flow is conveyed to the absorption column 1 via pipe 5, the remainder being conveyed to the negative-pressure chamber 13. The negative-pressure chamber 13 is kept at a pressure of 12 mmHg. About 4 percent of the water supplied, all the ethylene oxide in the flow supplied to 13 and any non-condensable products are evaporated. In the first ejector the evaporated phase is compressed to a pressure at which nearly all the water vapour may be condensed in a condenser having a barometric tube cooled with water from a cooling tower. Nearly all the ethylene oxide and any non-condensable substances are subsequently compressed in the second ejector and the mixture, driven by high-pressure steam, is blown in at the bottom of the stripping column 2, together with life steam supplied via pipe 10, so as to desorb the ethylene oxide. The aqueous phase 13, which is substantially free from ethylene oxide, is supplied to the top of the absorption column 1, which containes 30 perforated trays. The gaseous flow containing 2 percent by weight of ethylene oxide obtained by catalytic oxidation of ethylene with oxygen is supplied to column 1 via pipe 3. The secondary flow is supplied via pipe 5 to the fifth tray from the top of column 1. The weight ratio between the total absorption solution conveyed to column 1 and the gaseous mixture containing ethylene oxide and conveyed to the same column is 1:1. Column 1 operates at a pressure of 20 kg/cm² absolute.

Under the aforementioned operating conditions, an exhausted gaseous mixture containing 0.004 percent by weight of ethylene oxide is discharged at the top of column 1. Consequently, the ethylene oxide is practically completely recovered via pipe 9.

What we claim is:

1. A process for recovering ethylene oxide from a gaseous mixture containing it in quantities up to 3 percent by weight, using an aqueous solvent to absorb the gaseous mixture in an absorption region, stripping the enriched solvent with steam in a stripping region and recycling the lean solvent from the stripping region to the absorption region, characterized in that the lean recycled solvent is supplied in two flows, a main flow and a secondary flow, to two separate places in the absorption region, the main flow being supplied at a temperature equal to, or less than, 40° C and the secondary flow being substantially free from ethylene oxide and supplied at a temperature at least 15° C lower than the temperature of the main flow, the weight ratio between the main flow and secondary flow being kept at values of from about 2:1 to 5:1.

2. A process according to claim 1, characterized in that the main flow of lean recycled solvent is supplied at a temperature of from about 30° to 40° C.

3. A process according to claim 1, characterized in that the secondary flow of lean recycled solvent is supplied at a temperature of from about 12° to 25° C.

4. A process according to claim 1, characterized in that the secondary flow of lean recycled solvent, before being supplied to the absorption region, is kept at a pressure of from about 12 to 22 mmHg, so as to evaporate at least about 0.8 percent by weight thereof.

5. A process according to claim 1, characterized in that the operating pressure in the absorption region is from about 12 to 25 kg/cm² absolute.

6. A process according to claim 1, characterized in that the operating pressure in the stripping region is from about 1.2 to 2.5 kg/cm² absolute and the temperature is from about 104° to 127° C.

7. A process according to claim 1, characterized in that the weight ratio between the total aqueous solvent and the ethylene oxide in the absorption region is from about 20:1 to 100:1.

* * * * *